June 7, 1960 A. DUERKSEN 2,939,677
BEAD SPREADER FOR A TIRE IN A RETREADING MOLD
Filed July 22, 1957 2 Sheets-Sheet 1

INVENTOR.
Arnold Duerksen
BY
ATTYS

June 7, 1960 A. DUERKSEN 2,939,677
BEAD SPREADER FOR A TIRE IN A RETREADING MOLD
Filed July 22, 1957 2 Sheets-Sheet 2

INVENTOR.
Arnold Duerksen
BY
ATTYS

United States Patent Office 2,939,677
Patented June 7, 1960

2,939,677

BEAD SPREADER FOR A TIRE IN A RETREADING MOLD

Arnold Duerksen, Lodi, Calif., assignor to Super Mold Corporation of California, a corporation of California Filed July 22, 1957, Ser. No. 673,352

3 Claims. (Cl. 254—50.3)

This invention is directed to, and it is a major object to provide, a tire bead spreader of novel construction and function adapted for use with a tire disposed in an endless or band type tire retreading mold.

With a tire in the cavity of such a mold it is desirable to then spread the exposed beads of the tire apart to an extent to permit convenient insertion of an inside curing bag and an inside curing rim in the tire preparatory to the tread vulcanizing operation.

It is, therefore, another important object of this invention to provide, as an accessory or auxiliary apparatus, a simple handy lightweight tire spreader for the purpose described; the spreader being arranged so that it can be readily applied to or removed from the mold.

An additional object of the invention is to provide a tire spreader, as above, which includes a pair of lever arms disposed in spaced relation but movable toward each other to spread the tire beads apart; there being novel releasable holding means spanning between, and arranged to maintain, the lever arms in bead spreading position.

A further object of the invention is to provide a novel hand-supported, power-actuated unit initially separate from the lever arms but adapted to cooperatively engage therewith to cause movement of such lever arms in either a bead spreading direction or a bead releasing direction, selectively.

A further object of the invention is to provide a tire bead spreader which is designed for ease and economy of manufacture.

A still further object of the invention is to provide a practical, reliable, and durable tire bead spreader, and one which is exceedingly effective for the purpose for which it is designed.

These objects are accomplished by means of such structure and relative arrangement of parts as will fully appear by a perusal of the following specification and claims:

Figure 1:
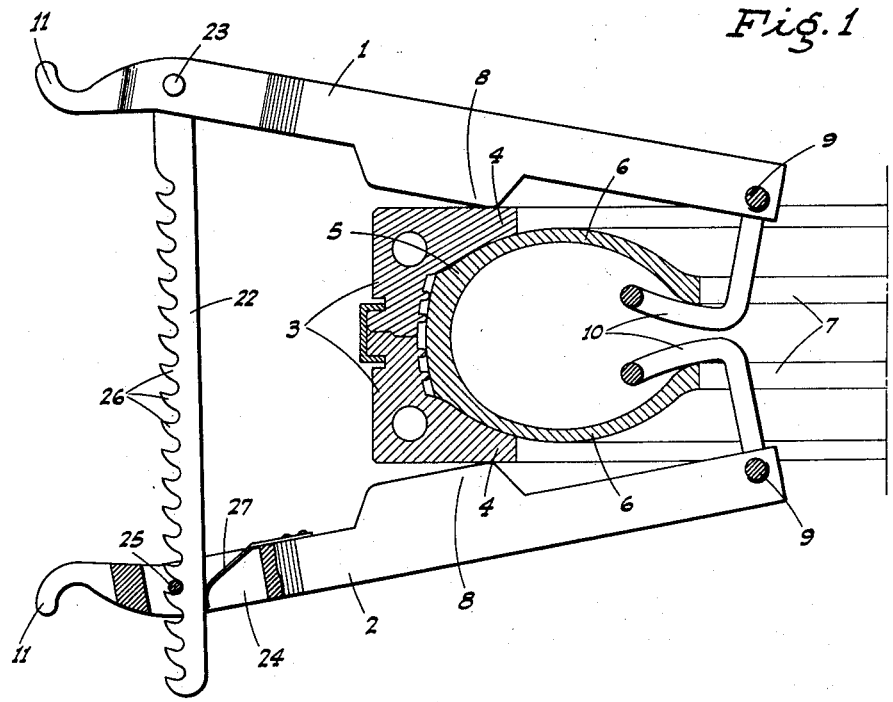
Fig. 1 is a plan view of one of the tire bead spreaders arranged with an endless or band type, tire retreading mold; the spreader being shown in its initial position in plan and partly broken away, while the mold and tire are in section.
Figure 3:
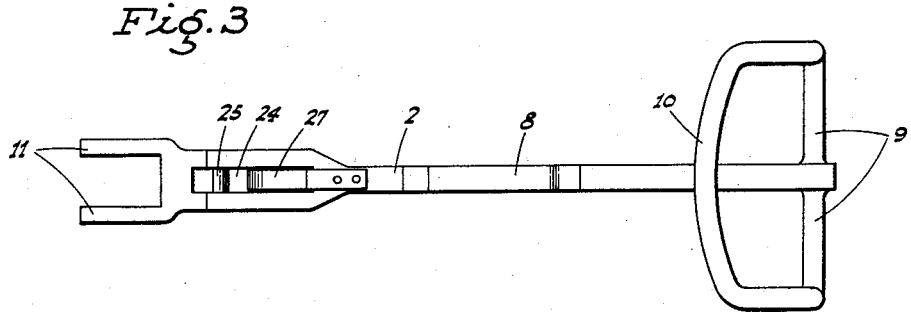
Fig. 3 is an elevation, from the inner side, of one of the lever arms detached.

Referring now more particularly to the drawings and to the characters of reference marked thereon, the bead spreader comprises a pair of laterally spaced lever arms 1 and 2 which extend generally radially of and with a section of the endless or band type, tire retreading mold 3 therebetween. The mold 3 includes side skirts 4 which define an annular cavity adapted for reception of the crown portion of a tire 5; such side skirts 4 terminating, at their inner edges, in a plane such that the side walls 6 and the beads 7 of the tire are free or exposed.

Intermediate their ends, the lever arms 1 and 2 are each formed with an integral inwardly projecting rocker block 8 which bears against the adjacent side of the mold 3.

At the inner end, each of the lever arms 1 and 2 is fitted with a rigid cross bar 9 which is formed with a tire bead engaging hook 10 of half loop like form, and which hook is adapted to engage the adjacent tire bead 7 from the inside in the manner shown, for example, in Fig. 1.

Each of the lever arms 1 and 2 is formed, at its outer end, with a laterally outwardly facing cradle type fork 11, which forks serve the purpose of receiving a manually portable lever arm actuating unit indicated generally at 12, and which unit comprises the following:

A double acting pneumatic power cylinder 13—adapted to be manipulated by a handle 14—includes a piston rod 15 which projects in slidable but non-rotatable relation outwardly of the cylinder 13 through a forward cylinder head 16; such head including—in vertical alinement—round nose stops 17 disposed above and below said piston rod 15.

At the outer end thereof, the piston rod 15 is fitted with a neck 18 having rows of vertically alined longitudinally spaced trunnions 19 projecting therefrom in opposite directions.

With the lever arms 1 and 2 disposed with a section of the mold 3 between said arms intermediate the ends thereof, and with the rocker blocks 8 bearing on opposite sides of such mold, after engagement of the hooks 10 with the adjacent beads 7, said lever arms initially occupy an outwardly divergent position, as in Fig. 1. Thereafter, the manually portable lever arm actuating unit 12 is engaged and extends transversely between the forks 11; the fork 11 on the lever arm 1 straddling the neck 18 and engaging selected ones of the vertically alined trunnions 19, while the fork 11 on the lever arm 2 straddles the piston rod 15 and engages the round nose stops 17. The power cylinder 13 is double acting and is controlled to extend or retract the piston rod 15 by means of push button valves 20 included in the fluid pressure supply conduit system of the cylinder, and which system is shown generally at 21.

With the manually portable lever arm actuating unit 12 engaged with the forks 11, as above described, the proper push button valve 20 is depressed to cause the piston rod 15 to retract and which, in turn, moves the forks 11 and the outer end portions of the lever arms 1 and 2 toward each other.

Figure 2:
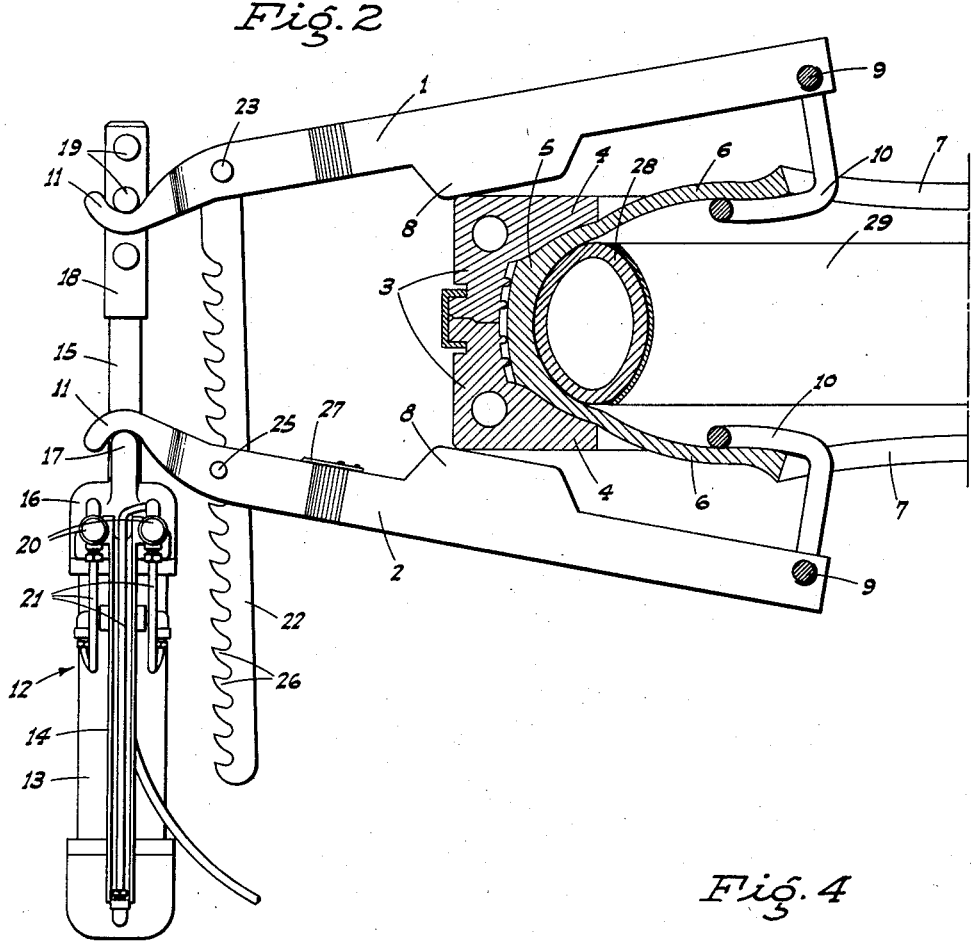
Fig. 2 is a similar view but shows the spreader in operation with the beads of the tire spread apart; the hand-supported, power-actuated unit being shown in engagement with said lever arms.
Figure 4:
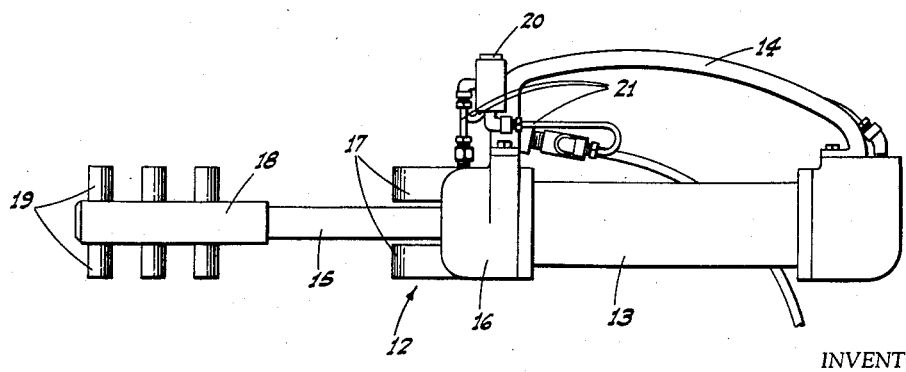
Fig. 4 is a side elevation of the hand-supported, power-actuated unit.

By virtue of such lever arms 1 and 2 rocking at blocks 8 on the sides of the mold 3, the inner ends of said lever arms, and the hooks 10, are relatively moved apart causing spreading of the beads 7, as shown in Fig. 2; the lever arms 1 and 2 then converging outwardly.

In order to hold the lever arms 1 and 2 in such converging bead spreading relation, and to permit the removal of the lever arm actuating unit 12 without said lever arms springing back to their initial position, the following holding means is employed:

A transversely extending ratchet type tension bar 22 is pivotally connected, as at 23, to the lever arm 1 adjacent but short of the corresponding fork 11. Such tension bar 22 thence spans between the lever arms and passes through a transverse slot 24 in the lever arm 2 adjacent but short of its fork 11. A vertical cross pin 25 extends from top to bottom of the transverse slot 24 intermediate its ends and cooperatively engages a tooth 26 of the ratchet type tension bar 22 which extends through said slot 24. The bar 22 is yieldably urged toward the cross pin 25 by a leaf spring 27 which bears on the edge of said bar opposite the row of ratchet teeth 26. With this arrangement, an automatic ratchet connection is provided between the lever arm 2 and the bar 22. In other words, as the outer ends of the lever arms 1 and 2 are moved toward each other by the lever arm actuating unit 12, the cross pin 25 progresses along said bar 22 and ultimately is received in holding relation by one of the teeth 26. Thereafter, the piston rod 15 is advanced by manipulation of the related push button valve 20, so that said unit 12 can be manually removed for use with another bead spreader constructed the same as above described but used at a diametrally opposite point on the mold 3.

With two such tire bead spreaders in use, the beads 7 are spread apart at opposite points on the tire 6, and are so held spread apart.

With the beads 7 spread apart, as above, an inside curing bag 28—together with an inside curing rim 29—can be readily inserted into the tire from one side thereof. After insertion of the inside curing bag 28 and inside curing rim 29, the lever arm actuating unit 12 is used in connection with the lever arms 1 and 2 of each bead spreader to release such arms and to permit removal of the spreader from the mold. This is accomplished by connecting the lever arm actuating unit 12 between the forks 11 in the manner previously described; the piston rod 15 then being retracted slightly so that the tension bar 22 can be manually shifted against the leaf spring 27 and to an extent that the cross pin 25 is clear of the row of ratchet teeth 26. With the tension bar so held, the piston rod 15 is extended, and with such extension of the piston rod, the lever arms 1 and 2 follow under the influence of the tire beads 7 tending to return to their normal non-spread position. When the beads 7 reach such non-spread position, the lever arm actuating unit 12 is detached from said lever arms 1 and 2 and the latter are removed from the mold after withdrawal of the bar 22 from the slot 24 and disengagement of the hooks 10 from said beads 7.

The above described tire bead spreader, when used in pairs and at diametrically opposed points on the mold, provides a very convenient, effective and positive apparatus for the spreading of the tire beads 7 for the purpose of ready insertion of an inside curing bag and an inside curing rim in the tire; such apparatus also being adapted for use and in the same manner to permit subsequent removal of said bag and rim from such tire.

From the foregoing description it will be readily seen that there has been produced such an apparatus as substantially fulfills the objects of the invention, as set forth herein.

While this specification sets forth in detail the present and preferred construction of the apparatus, still in practice such deviations from such detail may be resorted to as do not form a departure from the spirit of the invention, as defined by the appended claims.

Having thus described the invention, the following is claimed as new and useful and upon which Letters Patent is desired:

1. A spreader for the beads of a tire comprising a pair of spaced arms arranged to extend generally radially of the tire, a hook on the inner end of each arm to engage the corresponding tire bead from the inside, the arms intermediate their ends being supported for rocking movement whereby the engaged beads will be spread apart upon relative approaching movement of the outer ends of the arms, and power means detachably applied to the arms adjacent their outer ends to impart such movement thereto; the outer ends of the arms being formed with lateral forks and said means comprising an extensible power unit which includes a cylinder having a head and a piston rod projecting from the head and adapted to project through the forks, and stop elements on the head and on opposite sides of the rod engaging the adjacent forks from opposite sides thereof.

2. A spreader, as in claim 1, in which the forks are of cradle shape and face away from each other, and said fork engaging elements are rounded.

3. A spreader for the beads of a tire comprising a pair of rigid lever arms arranged to extend generally radially of the tire, a hook on the inner end of each lever arm to engage the corresponding tire bead from the inside, the lever arms being arranged for rocking movement in opposite directions whereby the engaged tire beads may be spread upon an accompanying approaching movement of the arms at their outer ends, means to releasably hold the arms in any position of approach, a manually portable fluid pressure power cylinder unit separate from the spreader, and cooperating elements on the ends of the unit and on the outer ends of the lever arms arranged for detachable coupling engagement with each other.

References Cited in the file of this patent

UNITED STATES PATENTS

| | | |
|---|---|---|
| 1,848,961 | Manley | Mar. 8, 1932 |
| 2,007,870 | Mangel | July 9, 1935 |
| 2,212,059 | Glover | Aug. 20, 1940 |
| 2,223,915 | Lambert | Dec. 3, 1940 |
| 2,259,975 | Hewel | Oct. 21, 1941 |
| 2,264,633 | Glynn | Dec. 2, 1941 |
| 2,525,114 | Branick | Oct. 10, 1950 |

FOREIGN PATENTS

| | | |
|---|---|---|
| 599,037 | Great Britain | Mar. 3, 1948 |